United States Patent
Price et al.

(10) Patent No.: US 11,802,620 B2
(45) Date of Patent: Oct. 31, 2023

(54) SYSTEM AND METHOD FOR PARKING ACTUATOR CONTROL

(71) Applicant: Honda Motor Co., Ltd., Tokyo (JP)

(72) Inventors: Steven Craig Price, Greensburg, IN (US); Perry Dean Palmerton, Batesville, IN (US)

(73) Assignee: HONDA MOTOR CO., LTD., Tokyo (JP)

( * ) Notice: Subject to any disclaimer, the term of this patent is extended or adjusted under 35 U.S.C. 154(b) by 357 days.

(21) Appl. No.: 16/823,810

(22) Filed: Mar. 19, 2020

(65) Prior Publication Data
US 2021/0293335 A1 Sep. 23, 2021

(51) Int. Cl.
*F16H 59/08* (2006.01)
*F16H 63/48* (2006.01)
*F16H 59/02* (2006.01)

(52) U.S. Cl.
CPC .......... *F16H 63/483* (2013.01); *F16H 59/08* (2013.01); *F16H 2059/0221* (2013.01)

(58) Field of Classification Search
CPC ............ F16H 63/483; F16H 2059/081; F16H 2059/0221; F16H 59/12; F16H 59/08; B60R 25/04; B60R 25/225; B60R 25/22; B60R 25/09; G07C 2009/00761
USPC ...................................................... 74/473.12
See application file for complete search history.

(56) References Cited

U.S. PATENT DOCUMENTS

| | | | | |
|---|---|---|---|---|
| 4,892,014 A * | 1/1990 | Morell | ................... | B60W 10/06 477/92 |
| 5,085,106 A * | 2/1992 | Bubnash | ................. | F16H 61/32 74/335 |
| 5,161,422 A * | 11/1992 | Suman | ................... | B60K 20/06 180/315 |
| 5,211,078 A * | 5/1993 | McCarthy | ............... | B60R 25/04 74/473.31 |
| 5,528,953 A * | 6/1996 | Steinle | ................... | B60K 20/02 74/335 |
| 5,696,679 A * | 12/1997 | Marshall | ............. | F16H 63/3416 701/1 |
| 5,827,149 A | 10/1998 | Sponable | | |
| 6,802,574 B2 * | 10/2004 | Ehrmaier | ............... | F16H 63/483 188/158 |

(Continued)

FOREIGN PATENT DOCUMENTS

CN 104091378 A * 10/2014
DE 102011109587 2/2013

(Continued)

*Primary Examiner* — T. Scott Fix
(74) *Attorney, Agent, or Firm* — RANKIN, HILL & CLARK LLP

(57) ABSTRACT

A shift device and method for coupling with a vehicle including a transmission and an electric parking actuator. The shift device includes a housing, a battery, a display interface, and a shift device connector. The shift device connector is on an end of the housing for electrically coupling the shift device to the vehicle. The shift device also includes a processor operatively connected to the battery, the display interface, and the shift device connector. Upon insertion of a first connector of the vehicle into the shift device connector, the controller receives a shift position of the transmission and controls the electric parking actuator to change the shift position of the transmission.

18 Claims, 7 Drawing Sheets

(56) References Cited

U.S. PATENT DOCUMENTS

| | | | |
|---|---|---|---|
| 9,683,654 B2* | 6/2017 | Kim | F16H 59/0278 |
| 9,726,284 B2 | 8/2017 | Adams, Jr. et al. | |
| 9,732,850 B2 | 8/2017 | Spooner et al. | |
| 2013/0261845 A1* | 10/2013 | Ho | G07C 9/00944 701/2 |
| 2013/0289829 A1* | 10/2013 | Ho | B60K 37/06 701/48 |
| 2016/0245404 A1 | 8/2016 | Barclay | |
| 2017/0227960 A1* | 8/2017 | Joyce | G05D 1/0088 |
| 2018/0079302 A1* | 3/2018 | Tsai | B60K 26/02 |
| 2018/0274665 A1 | 9/2018 | Botella et al. | |
| 2020/0142395 A1* | 5/2020 | Delbari | B60W 30/06 |
| 2021/0039496 A1* | 2/2021 | Sung | G10L 15/22 |

FOREIGN PATENT DOCUMENTS

| | | | |
|---|---|---|---|
| DE | 102016223953 | 6/2018 | |
| FR | 2672952 A1 * | 8/1992 | B60K 28/063 |
| JP | 2002248959 A * | 9/2002 | B60K 37/06 |
| WO | WO-2020095201 A1 * | 5/2020 | B60K 37/06 |

\* cited by examiner

SYSTEM AND METHOD FOR PARKING ACTUATOR CONTROL

BACKGROUND

During manufacturing and/or repair, some vehicles, particularly hybrid electric vehicles, cannot be shifted into and out of different transmission modes (e.g., shifted from a park transmission mode to a neutral transmission mode). For example, vehicles with no-start conditions cannot be shifted into different transmission modes to push the vehicles off the end of a production line. Instead, these vehicles are elevated with a jack and placed on wheel dollies to be manually pushed off the production line. Similar issues exist in the event of a no-brake fill on a hybrid electric vehicle and during installation of a prop shaft on some vehicles. The inability to shift a vehicle under these conditions creates downtime, safety hazards, and quality concerns.

BRIEF DESCRIPTION

According to one aspect, a shift device for coupling with a vehicle including a transmission and an electric parking actuator, includes a housing, a battery in the housing, a display interface in the housing for facilitating input and output to the shift device, and a shift device connector. The shift device connector is disposed on an end of the housing for electrically coupling the shift device to the vehicle. A processor disposed in the housing is operatively connection to the battery, the display interface, and the shift device connector. Upon insertion of a first connector of the vehicle into the shift device connector, the controller receives a shift position of the transmission and controls the electric parking actuator to change the shift position of the transmission.

According to another aspect, a method for controlling a vehicle including a transmission and an electric parking actuator includes providing a shift device to control the electric parking actuator. The shift device includes a processor and a shift device connector disposed on an end of the shift device for electrically coupling the shift device to the electric parking actuator. The method includes disconnecting a first connector between the electric parking actuator and a power source of the vehicle. The method also includes electrically coupling the shift device to the vehicle by inserting the first connector into the shift device connector. The processor receives a shift position of the transmission and controls the electric parking actuator to change the shift position of the transmission.

According to a further aspect, a computer-implemented method for controlling a vehicle including a transmission and an electric parking actuator includes, upon coupling a first connector of the vehicle to a shift device connector disposed on a shift device, establishing an electrical connection between the electric parking actuator and the shift device. The method includes receiving a first shift position of the transmission using the electrical connection. The method includes receiving a user input at the shift device to shift the transmission from the first shift position to a second shift position. The second shift position is opposite the first shift position. Further, the method includes controlling the electric parking actuator using the electrical connection to change the first shift position of the transmission to the second shift position.

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
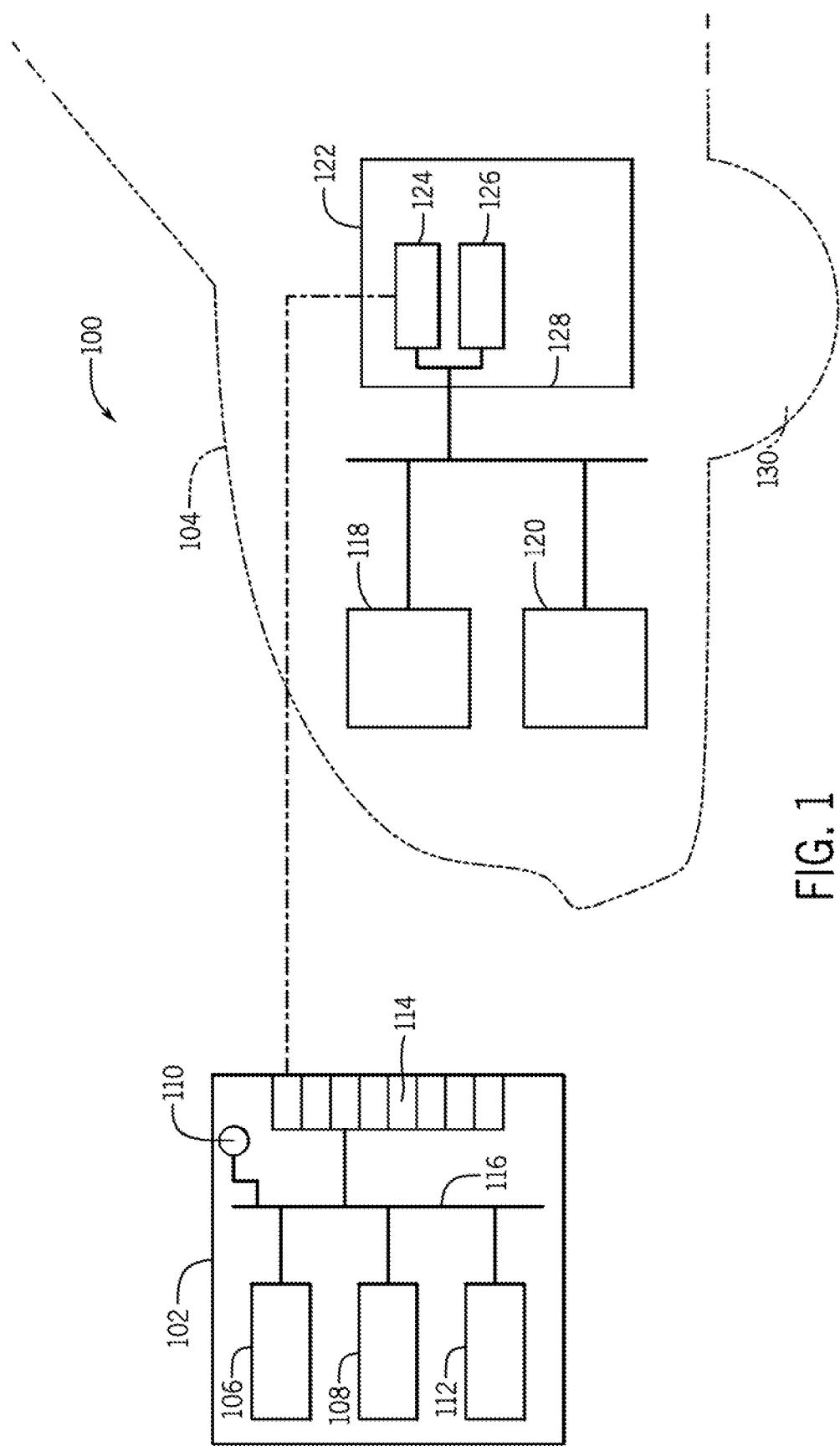
FIG. 1 is a block diagram of a system for parking actuator control according to an exemplary embodiment.

The following includes definitions of selected terms employed herein. The definitions include various examples and/or forms of components that fall within the scope of a term and that may be used for implementation. The examples are not intended to be limiting. Further, the components discussed herein, may be combined, omitted or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more computing devices (e.g., computer, personal digital assistant, cellular telephone, network device, vehicle, vehicle computing device, infrastructure device, roadside device) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. A database may be stored, for example, at a disk and/or a memory.

"Disk," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Operable connection," or a connection by which entities are "operably connected," is one in which signals, physical communications, and/or logical communications may be sent and/or received. An operable connection may include a wireless interface, a physical interface, a data interface, and/or an electrical interface.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Portable device," as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more human occupants. Further, the term "vehicle" may include vehicles that are automated or non-automated with pre-determined paths or free-moving vehicles.

"Vehicle control system," and/or "vehicle system," as used herein may include, but is not limited to, any automatic or manual systems that may be used to enhance the vehicle, driving, and/or security. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

Figure 2:
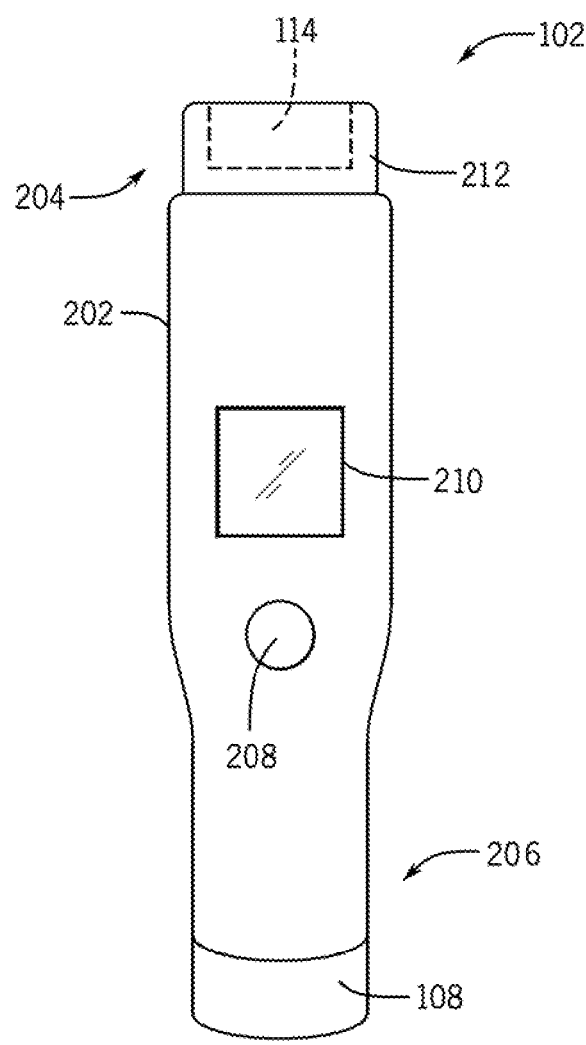
FIG. 2 is an isometric view of the shift device of FIG. 1 according to an exemplary embodiment.

Referring now to the drawings, wherein the showings are for purposes of illustrating one or more exemplary embodiments and not for purposes of limiting same, FIG. 1 is a block diagram of a system 100 for parking actuator control according to an exemplary embodiment. The system 100 includes a shift device 102 and a vehicle 104. The shift device 102 generally includes a processor 106 (e.g., a controller, a microcontroller, a control unit), a battery 108, an on/off switch 110, a communication interface 112, and a shift device connector 114, each operably connected for computer communication using, for example, a bus 116 or other wired and/or wireless communication. The shift device 102 can be a portable device. For example, in some embodiments, the shift device 102 can be a handheld device and operated by a user (not shown). An illustrative view of an exemplary shift device 102 according to one embodiment is shown in FIG. 2. For simplicity and clarity of illustration, reference numerals have been repeated among the different figures where appropriate to indicate corresponding or analogous elements. In FIG. 2, a housing 202 having a first end 204 and a second end 206 is designed to at least partially house one or more of the components of the shift device 102.

Referring again to FIG. 1, a vehicle 104 generally includes a power source 118, an electronic control unit (ECU) 120, a transmission 122, an electric parking actuator 124, and a transmission position sensor 126, each of which are operably connected for computer communication using a bus 128 and/or other wired or wireless communication described herein. In one embodiment, the shift device 102 is capable of interfacing with the vehicle 104, and in particular, the transmission 122 and the electric parking actuator 124. More specifically, the shift device 102 is a portable device capable of controlling and/or powering the electric parking actuator 124 to shift the transmission 122 from one transmission mode to another transmission mode.

Referring again to the shift device 102 of FIG. 1, the processor 106 facilitates operation of the shift device 102 and can include logic circuitry with hardware, firmware, and software architecture frameworks for facilitating control of the transmission 122, the electric parking actuator 124, and for facilitating communication between the shift device 102, the components of the shift device 102, and the vehicle 104. Thus, in some embodiments, the processor 106 can store application frameworks, kernels, libraries, drivers, application program interfaces, among others, to execute and control hardware and functions discussed herein. Although not shown in FIG. 1, in some embodiments, the shift device 102 can include a memory and/or a database, which can store data and/or similar components as the processor 106 for execution by the processor 106.

The battery 108 provides power to the shift device 102 and can be any type of power source capable of powering the shift device 102. In some embodiments, the battery 108 is a 12-volt lithium ion battery that is rechargeable. In FIG. 2, the battery 108 is shown protruding from the housing 202 at the second end 206 of the shift device 102. In this embodiment, the battery 108 is removable from the housing 202. Thus, the battery 108 can be removed from the shift device 102 and charged for example, by inserting the battery 108 into a charging unit (not shown).

Referring again to FIG. 1, the on/off switch 110 controls the supply of power via the battery 108 to the shift device 102. As shown in FIG. 2, in one embodiment, the on/off switch 110 can be actuated by a button 208 pressed by a user (not shown). Actuation of the on/off switch 110 can be designed to be a sequence type button, wherein successive pushes of the button 208 move the shift device 102, for example from an off state and to an on state using the on/off switch 110. As will be described herein, the button 208 can also be used to initiate control of the electric parking actuator.

Referring again to FIG. 1, the communication interface 112 can include provisions for receiving input and/or communicating information as output. In some embodiments, the communication interface 112 can include one or more input buttons, switches, touch screen, touch pad, pointer, lights, microphones, speakers, LEDs, among others. In the embodiment shown in FIG. 2, the communication interface 112 can include the button 208 and a display 210, which can be controlled by the communication interface 112 as an input and/or output device. For example, as will be discussed herein in more detail, a shift position of the transmission 122 can be output by the communication interface 112 to the display 210. In some embodiments, the change in the shift position of the transmission 122 can be initiated via actuation of the button 208 and/or a touch input to the display 210. Thus, in some embodiments, the display 210 can be a touchscreen. In other embodiments, the communication interface 112 can have multicolor (e.g., RGB) LEDs in addition to and/or in lieu of the display 210. It is understood that the communication interface 112 can have different components and configurations than that shown in FIG. 2.

In some embodiments, the communication interface 112 can include network interface controllers (not shown) and other hardware and software that manages and/or monitors connections and controls bi-directional data transfer between the communication interface 112 and other components of the system 100, for example, the vehicle 104. In some embodiments, the communication interface 112 can be operatively connected for computer communication to one or more networks (not shown). The communication can be facilitated by any type of communication hardware and/or protocols discussed herein (e.g., WiFi, Bluetooth).

Referring again to FIG. 1, the shift device connector 114 electrically couples the shift device 102 to the vehicle 104. More specifically, and as will be discussed in more detail with FIGS. 3A and 3B, the shift device connector 114 is coupled to a connector of the vehicle 104 thereby allowing the shift device 102 to provide power and/or control the electric parking actuator 124. In FIG. 2, the shift device connector 114 is shown enclosed in a sleeve (e.g., as a receiving terminal) 212 and disposed on the first end 204 of the shift device 102 opposite the battery 108. It is understood that the shift device connector 114 can be any type of electrical connector and/or terminal used to mate with a connector of the vehicle 104. Further, it is understood that the shift device connector 114 can be disposed on any portion of the shift device 102. As will be discussed herein, the shift device connector 114 can be electrically coupled to the power source 118 and/or the ECU 120 for control of the electric parking actuator 124.

Referring again to FIG. 1, the vehicle 104 will now be described in more detail. As mentioned above, the vehicle 104 includes the power source 118 which can be, for example, an internal combustion engine, one or more electric motors powered by one or more electric batteries, fuel cells, among others. In one embodiment, the vehicle 104 is a hybrid electric vehicle where the power source 118 is an internal combustion engine combined with an electric propulsion system.

The ECU 120 is a microcomputer (e.g., a processor) that performs overall control of the vehicle 104, including the transmission 122, the electric parking actuator 124, and the transmission position sensor 126. For simplicity, only one electronic control unit is shown, however, it is understood, that in some embodiments the vehicle 104 can include more than one electronic control unit that can facilitate one or more aspects of the systems and methods discussed herein. For example, in some embodiments, the vehicle 104 can include an electronic control unit that controls operation of the transmission 122 (e.g., a transmission control unit) and an electronic control unit that controls operation of the electric parking actuator 124.

The ECU 120 can include logic circuitry with hardware, firmware, and software architecture frameworks for facilitating control of the vehicle 104, facilitating communication between the components of the vehicle 104, and facilitating communication between the shift device 102 and the vehicle 104. Thus, in some embodiments, the ECU 120 can store application frameworks, kernels, libraries, drivers, application program interfaces, among others, to execute and control hardware and functions discussed herein. Although not shown in FIG. 1, in some embodiments, the ECU 120 can include a memory and/or a database, which can store data and/or similar components as the ECU 120 for execution by the ECU 120.

The transmission 122 uses power from the power source 118 to control wheel(s) 130 of the vehicle 104. Typically, a driver (not shown) controls gear shifting of the transmission 122 using an electromechanical interface (not shown) disposed inside the vehicle 104. The transmission modes of the transmission 122 can include, but are not limited to, a park (P) transmission mode, a Reverse (R) transmission mode, a Neutral (N) transmission mode, a drive (D) transmission mode, and a sport (S) transmission mode, however it is understood that other transmission modes not discussed herein can be implemented.

When the vehicle 104 is shifted into a park transmission mode, the ECU 120 controls the transmission 122 to shift into park. In the park position, the wheel(s) 130 are in a rotation incapable state. When the vehicle 104 is shifted into a reverse transmission mode, the ECU 120 controls the transmission 122 to shift into reverse to enable the vehicle 104 to move backward. In a neutral transmission mode, the ECU 120 controls the transmission 122 to a neutral gear to enable the wheel(s) 130 to move freely. In the neutral position, the wheel(s) 130 are in a rotation capable state. In a drive transmission mode and/or a sport transmission mode, the ECU 120 controls the transmission 122 to enable the vehicle 104 to move forward at a particular gear ratio. In some embodiments, the transmission 122 is a shift-by-wire system by which the transmission modes are engaged and/or changed through electronic and/or electromechanical control.

For example, in FIG. 1, the transmission 122 includes the electric parking actuator 124, which can be mounted (not shown) on the transmission 122. The electric parking actuator 124 is a parking lock mechanism that can lock an output shaft (not shown) of the transmission 122. Specifically, the electric parking actuator 124 operates by activating a parking mechanism (e.g., a parking pawl, a parking gear of the transmission 122) in accordance with a control signal from the ECU 120. When the electric parking actuator 124 is engaged, the wheel(s) 130 are in a rotation incapable state. When the electric parking actuator 124 is disengaged, the wheel(s) 130 are in a rotation capable state. The transmission position sensor 126 can detect a shift position (e.g., a transmission mode) of the transmission 122 and can transmit a corresponding signal indicating the shift position to the ECU 120.

Figure 3A:
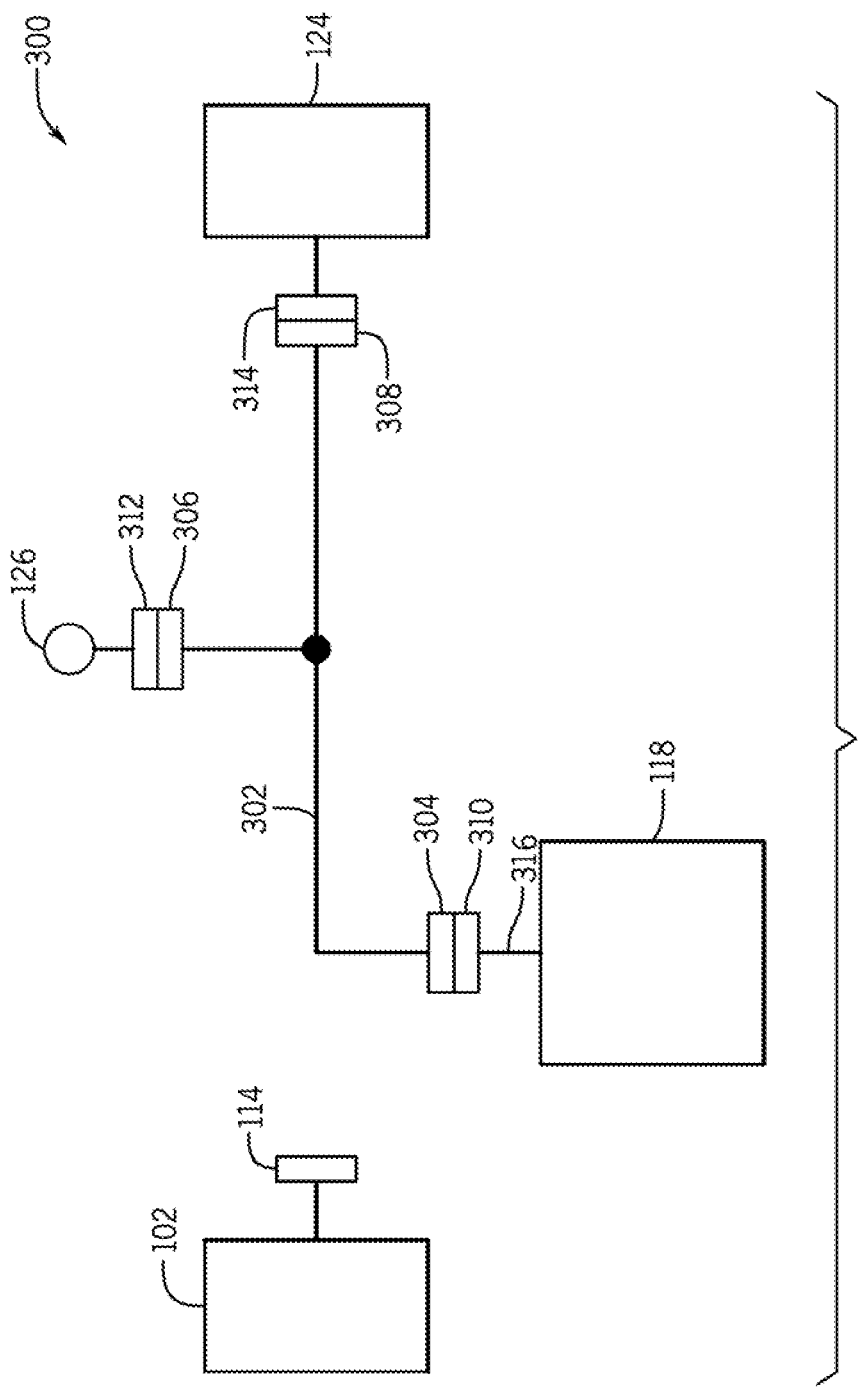
FIG. 3A is a schematic view of a wire harness configuration according to an exemplary embodiment.
Figure 3B:
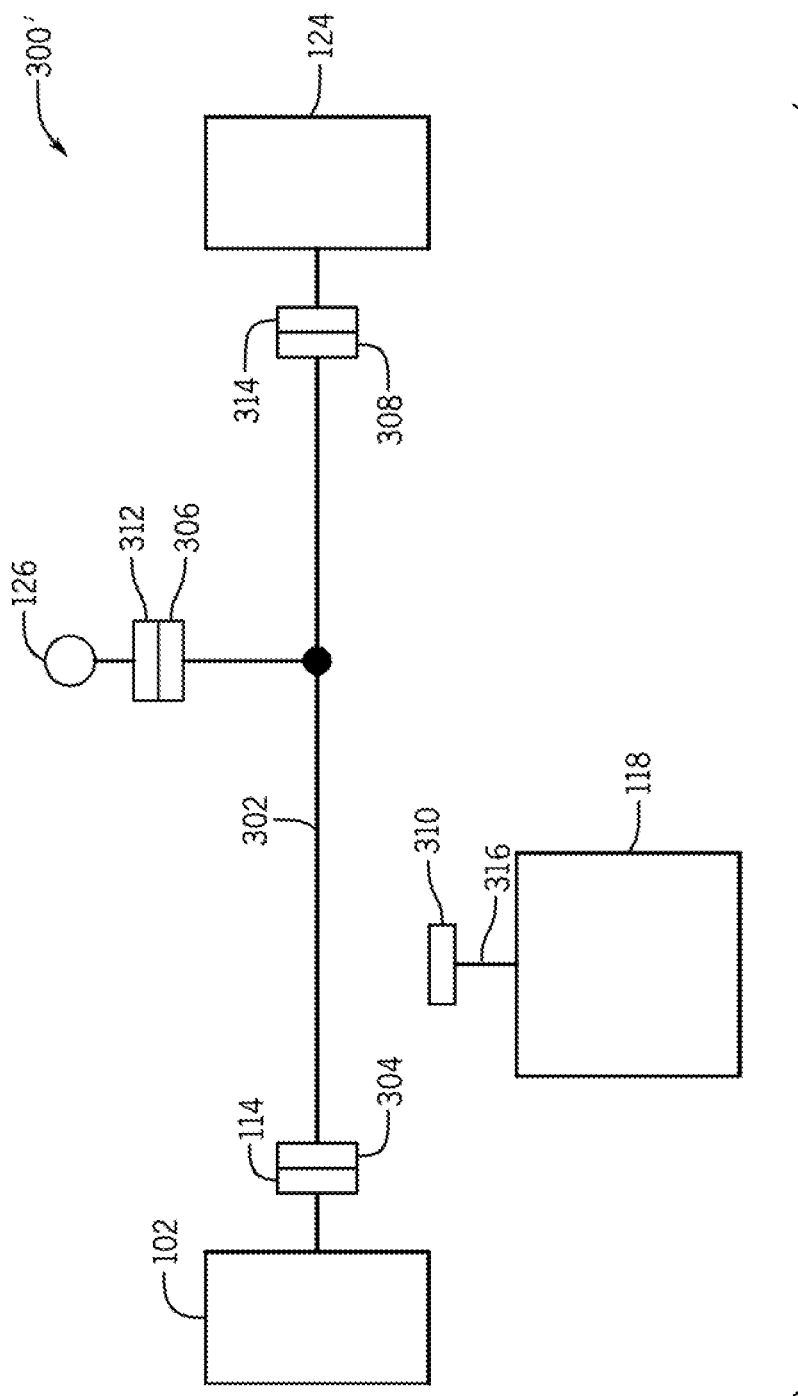
FIG. 3B is a schematic view of the wire harness configuration of FIG. 3A connected to the shift device.

Interfacing between the vehicle 104 and the shift device 102 will now be described in more detail. FIG. 3A is a schematic diagram of a wire harness configuration 300 according to an exemplary embodiment, and FIG. 3B is a schematic diagram of a wire harness configuration 300' including connection to the shift device 102. For simplicity and clarity of illustration, reference numerals have been repeated among the different figures where appropriate to indicate corresponding or analogous elements. The wire harness configurations in FIGS. 3A and 3B are constructed for providing electrical and communication interconnection for the electric parking actuator 124. However, it will be understood that the methods and systems described herein can be used on many different types, configurations, and complexities of electrical harnesses. Further, it is also understood that the wire harnesses described herein can include different kinds of lines, such as power, digital, analog, and ground, and that these wires come in many sizes and materials, or may be formed as individual wires, wire pairs, twisted wire pairs, or co-axial cables. Additionally, one or more components of the wire harnesses discussed herein can be connected and/or disposed on one or more wire harnesses uses for different vehicle subsystems (e.g., an engine wire harness, a transmission wire harness).

In FIG. 3A, a wire harness 302 includes a first connector 304, a second connector 306, and a third connector 308 for mating with mating connectors of the shift device 102 and/or the vehicle 104. However, it is understood that other interconnections and other numbers of interconnections can be used. More specifically, the first connector 304 is electrically coupled to the power source 118 by a power source connector 310. In some embodiments, the power source connector 310 is electrically coupled to the power source 118 by an engine wire harness 316. The engine wire harness 316 can also provide electrical communication to other components not shown in FIG. 3A and FIG. 3B, for example, the ECU 120. The second connector 306 is electrically coupled to the transmission position sensor 126 by a position sensor connector 312. The third connector 308 is electrically coupled to the electric parking actuator 124 by an electric parking actuator connector 314. In the wire harness configuration 300 of FIG. 3A, the electric parking actuator 124 is supplied power from the power source 118. The transmission position sensor 126 can detect the shift position of the transmission 122 which can be communicated (e.g., by the ECU 120) to the electric parking actuator or to another component of the vehicle 104.

FIG. 3B illustrates the wire harness 302 of FIG. 3A, but according to a wire harness configuration 300'. Specifically, the first connector 304 has been uncoupled (e.g., disconnected) from the power source connector 310 and/or the engine wire harness 316, and instead, is electrically coupled to the shift device connector 114. Thus, the shift device 102 is in electrical and communication interconnection with the electric parking actuator 124. Accordingly, and as will be discussed in more detail herein, the shift device 102 and can facilitate supplying power and/or control of the electric parking actuator 124.

Figure 4:
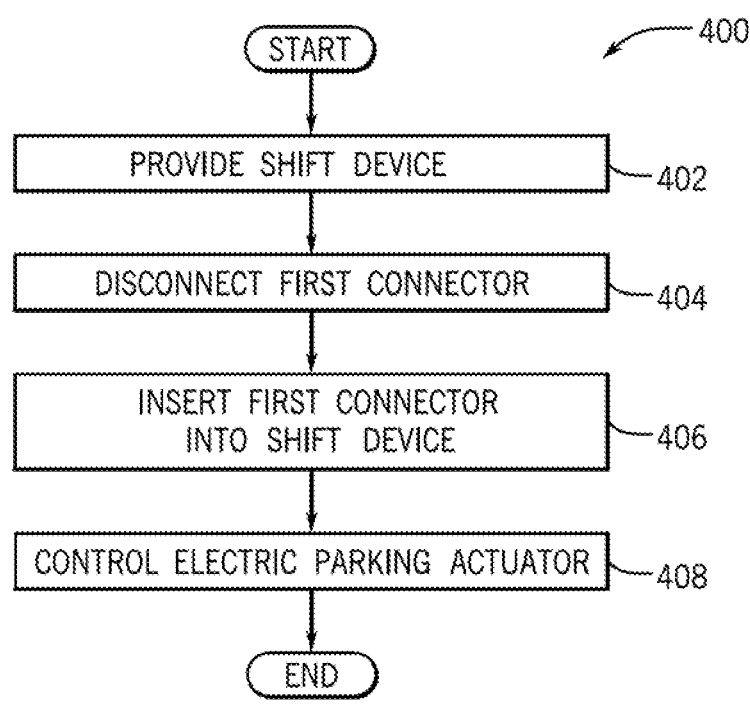
FIG. 4 is a process flow diagram of a method for parking actuator control according to an exemplary embodiment.

Exemplary methods for parking actuator control implementing and referencing the components of FIGS. 1, 2, 3A, and 3B will now be described. FIG. 4 is a process flow diagram of a method for parking actuator control according to an exemplary embodiment. Specifically, FIG. 4 describes operations of one or more components of the shift device 102 and/or the vehicle 104 (e.g., the processor 106 and/or the ECU 120). At block 402, the method 400 includes providing a shift device. For example, the shift device 102, which as described above in detail with FIGS. 1 and 2, includes the processor 106 and the shift device connector 114. As shown in FIG. 2, the shift device connector 114 can be disposed on the first end 204 of the shift device 102. The shift device connector 114 is for electrically coupling the shift device 102 to the electric parking actuator 124. For example, as shown in FIG. 3B, the shift device connector 114 is electrically coupled to the first connector 304 thereby providing electrical and communication interconnection with the vehicle 104, the transmission 122, and the electric parking actuator 124.

At block 404, the method 400 includes disconnecting the first connector, and at block 406, the method 400 includes inserting the first connector into the shift device. For example, as shown in FIG. 3A, the wire harness 302 is connected to the power source 118 of the vehicle 104 using the first connector 304 via the engine wire harness 316 and the power source connector 310. As shown in FIG. 3B, a user (not shown), can disconnect the first connector 304 from the power source connector 310 and/or the engine wire harness 316. Accordingly, the first connector 304 is uncoupled from the power source 118 and/or the engine wire harness 316. The user (not shown) can then electrically couple the shift device 102 to the vehicle 104. For example, by inserting the first connector 304 into the shift device connector 114, the shift device 102 is in electrical and communication interconnection with the electric parking actuator 124.

Coupling the shift device 102 to the electric parking actuator 124 allows the shift device 102 via the battery 108 to power the electric parking actuator 124 and engage (discussed below) the electric parking actuator 124. Thus, in the event the transmission 122 does not receive power from the power source 118 (e.g., unable to be started at the end of a production line), the shift device 102 provides convenient control of the electric parking actuator 124.

Referring again to FIG. 4, at block 408, the method 400 includes controlling the electric parking actuator. In one embodiment, the processor 106 receives a shift position of the transmission 122 using, for example, the transmission position sensor 126. As an illustrative example, if the transmission 122 is in a park transmission mode, the processor 106 via the shift device connector 114 receives a signal from the transmission position sensor 126 (e.g., via the ECU 120) indicating the transmission 122 is in a park position. In another embodiment, if the transmission 122 is in a neutral transmission mode, the processor 106 via the shift device connector 114 receives a signal from the transmission position sensor 126 (e.g., via the ECU 120) indicating the transmission is in a neutral position. In some embodiments, the processor 106 controls the communication interface 112 to output the shift position to the display 210 to communicate same to the user (not shown).

The processor 106 can control the electric parking actuator 124 to change the shift position of the transmission 122 based on the shift position detected by the transmission position sensor 126. In some embodiments, the user (not shown) provides a user input at an input button of the shift device 102. For example, the user (not shown) can actuate the button 208 (FIG. 2). Upon receiving the user input, the processor 106 can initiate control of the electric parking actuator 124. For example, the processor 106 can supply an electric current via the shift device connector 114 thereby providing power to the electric parking actuator 124. As another example, upon providing the user input, the processor 106 transmits a control signal via the shift device connector 114 and the ECU 120 to the electric parking actuator 124 to change the shift position of the transmission 122 to a park position or a neutral position.

In this example, the park position and the neutral position are opposite shift positions. When the shift position detected by the transmission position sensor 126 is in the park position, wheel(s) 130 of the vehicle 104 are in a rotation incapable state. When the shift position detected by the transmission position sensor 126 is in the neutral position, the wheel(s) 130 of the vehicle 104 are in a rotation capable state. Accordingly, in one embodiment, upon receiving user input at the shift device 102, the processor 106 changes the shift position of the transmission 122 to a shift position that is opposite (e.g., an opposite shift position) to the shift position detected by the transmission position sensor 126. Thus, if the shift position is the park position, the processor 106 transmits a control signal to the electric parking actuator 124 to change the shift position of the transmission 122 to the neutral position (i.e., the opposite shift position of the park position). If the shift position is the neutral position, the processor 106 transmits a control signal to the electric parking actuator 124 to change the shift position of the transmission 122 to the park position (i.e., the opposite shift position of the neutral position). Accordingly, the shift device 102 provides a way to shift the vehicle 104 under no-start conditions.

Figure 5:
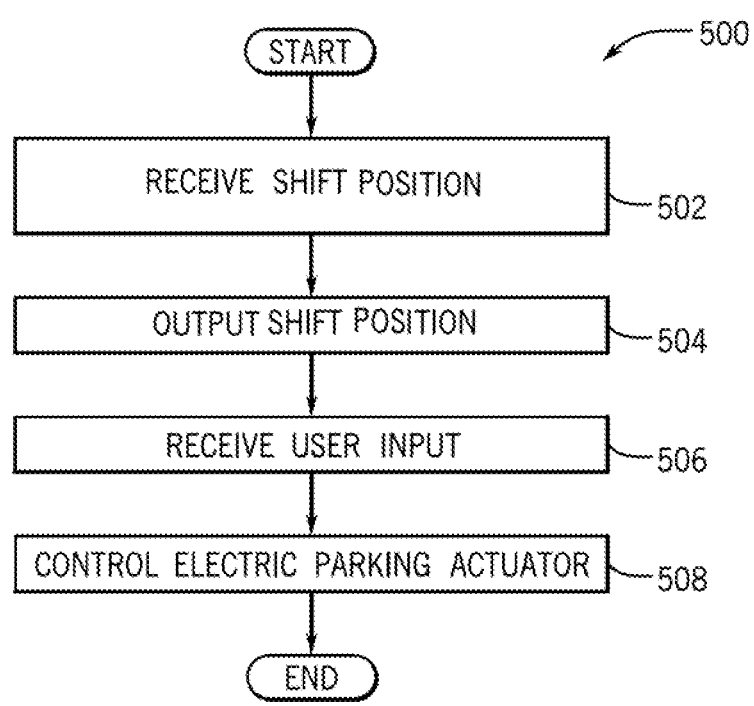
FIG. 5 is a process flow diagram of a method for parking actuator control according to another exemplary embodiment.

Referring now to FIG. 5, a process flow diagram of a method 500 for parking actuator control according to another exemplary embodiment is shown. Specifically, FIG. 5 describes operations of one or more components of the shift device 102 and/or the vehicle 104 (e.g., the processor 106 and/or the ECU 120), and will be described with reference to FIGS. 1, 2, 3A, and 3B. In one embodiment, and as described in detail above, the shift device 102 includes the housing 202, the battery 108 in the housing 202, and the display 210 on the housing 202 for facilitating input and output to the shift device 102. The shift device 102 also includes the shift device connector 114 on the first end 204 of the housing 202 for electrically coupling the shift device 102 to the vehicle 104. Further, a processor 106 is disposed in the housing 202 and operatively connected to the battery 108, the communication interface 112 (e.g., the button 208, the display 210), and the shift device connector 114.

Referring again to FIG. 5, at block 502, the method 500 includes receiving a shift position of a vehicle. For example, upon insertion of the first connector 304 of the vehicle 104 into the shift device connector 114, the processor 106 receives a shift position of the transmission 122 from the transmission position sensor 126. Accordingly, at block 504, the method 500 includes outputting the shift position. For example, upon receiving the shift position of the vehicle 104, the processor 106 controls the communication interface 112 to output the shift position to the display 210 on the housing 202. This provides an indication to the user (not shown) of the shift position that the vehicle 104 is currently operating under.

At block 506, the method 500 includes receiving user input. The communication interface 112 is configured to receive a user input at an input button of the shift device 102. For example, the user (not shown) can actuate the button 208 (FIG. 2). In one embodiment, upon receiving the user input, the processor 106 supplies an electric current (e.g., using the battery 108) via the shift device connector 114 thereby providing power to the electric parking actuator 124. As will be discussed with block 508, in one embodiment, upon receiving the user input, the processor 106 initiates changing the shift position of the transmission 122.

Accordingly, at block 508, the method 500 includes controlling the electric parking actuator. For example, in one embodiment, upon receiving the user input the processor 106 transmits a control signal via the shift device connector 114 and the ECU 120 to the electric parking actuator 124 to change the shift position of the transmission 122. In one embodiment, the electric parking actuator 124 changes the shift position of the transmission 122 to a park position or a neutral position based on the control signal and/or the shift position.

In another embodiment, the processor 106 controls the electric parking actuator 124 to change the shift position of the transmission 122 to the neutral position when the shift position is the park position. When the shift position is the park position, wheel(s) 130 of the vehicle 104 are in a rotation incapable state. Additionally, the processor 106 controls the electric parking actuator 124 to change the shift position of the transmission 122 to the park position when the shift position is the neutral position. When the shift position is in the neutral position, the wheels of the vehicle 104 are in a rotation capable state. As described above in detail with FIG. 4, the park position and the neutral position are opposite shift positions. When the shift position detected by the transmission position sensor 126 is in the park position, wheels of the vehicle 104 are in a rotation incapable state. When the shift position detected by the transmission position sensor 126 is in the neutral position, the wheel(s) 130 of the vehicle 104 are in a rotation capable state. Accordingly, in one embodiment, upon receiving user input at the shift device 102, the processor 106 changes the shift position of the transmission 122 to a shift position that is opposite (e.g., an opposite shift position) to the shift position detected by the transmission position sensor 126.

Figure 6:
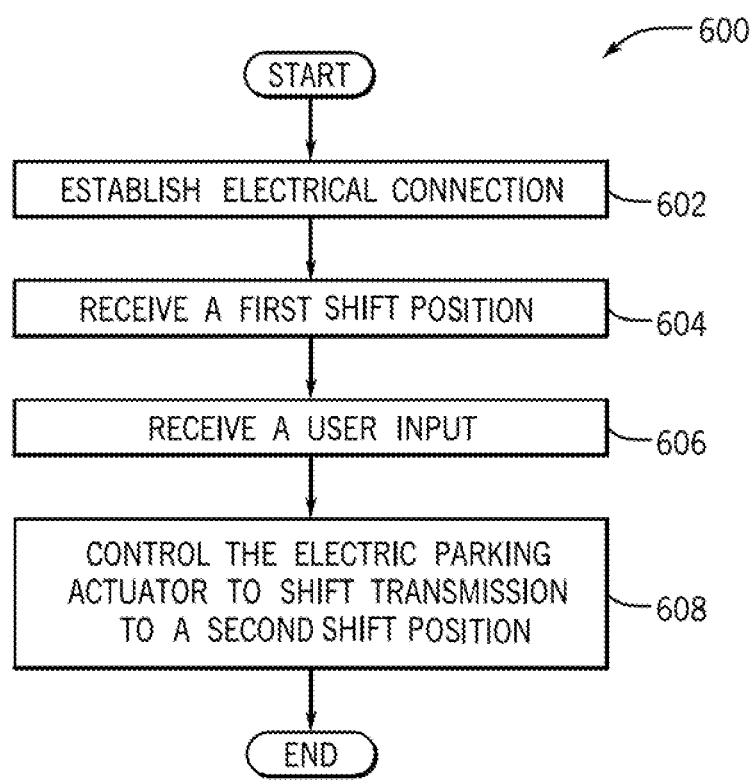
FIG. 6 is a process flow diagram of a method for parking actuator control according to a further exemplary embodiment.

Referring now to FIG. 6, a process flow diagram of a method 600 for parking actuator control according to a further exemplary embodiment is shown. Specifically, FIG. 5 describes operations of one or more components of the shift device 102 and/or the vehicle 104 (e.g., the processor 106 and the ECU 120), and will be described with reference to FIGS. 1, 2, 3A, and 3B. At block 602, the method 600 includes establishing an electrical connection between the shift device 102 and the electric parking actuator 124. For example, as described above with FIG. 3B, upon coupling the first connector 304 of the vehicle 104 to the shift device connector 114 disposed on the shift device 102, an electrical connection is established whereby the shift device 102 is in electrical and communication interconnection with the electric parking actuator 124.

At block 604, the method 600 includes receiving a first shift position. As discussed above, the processor 106 via the shift device connector 114 receives a signal from the transmission position sensor 126 indicating the shift position and/or transmission mode of the transmission 122. This shift position and/or transmission mode can be referred to as a first shift position or a current shift position of the vehicle 104. In some embodiments, the processor 106 controls the communication interface 112 to output the first shift position to the display 210 thereby communicating the first shift position to a user (not shown).

At block 606, the method 600 includes receiving a user input at the shift device 102 to shift the transmission 122 from the first shift position to a second shift position. For example, a user (not shown) can actuate the button 208 to initiate shifting of the transmission 122 from the first position to the second shift position. In one embodiment, the first shift position and the second shift position are one of a park position or a neutral position. As discussed above in detail with FIG. 4, the second shift position is opposite the first shift position. For example, if the first shift position is a park position, the second shift position is a neutral position, and vice versa.

At block 608, the method 600 includes controlling the electric parking actuator 124 using the electrical connection to change the first shift position of the transmission 122 to the second shift position. In one embodiment, controlling the electric parking actuator 124 includes providing an electric current via the shift device connector 114 thereby providing power (e.g., using the battery 108) to the electric parking actuator to shift the transmission 122. Additionally, the processor 106 can transmit a control signal via the shift device connector 114 to the electric parking actuator 124 to change the first shift position of the transmission from the first shift position to the second shift position.

The methods and systems discussed herein can be utilized in many scenarios where vehicles cannot be shifted into and out of a park transmission mode, for example, on a production line, during a no brake fill on a hybrid vehicle, and during installation of prop shafts. For example, in the event that the vehicle 104 cannot be powered on (e.g., end of a production line), the shift device 102 allows the user to connect the vehicle 104 and shift the vehicle 104 into a neutral position so that the vehicle 104 can be moved off the production line without the use of wheel dollies. Once the vehicle 104 is moved to a desired position, the shift device can be used to shift the vehicle 104 back into a park position. This can avoid downtime along the production line and decrease quality concerns.

As another illustrative example, if the vehicle 104 is a no brake fill hybrid vehicle, the shift device 102 can be used to shift the vehicle 104 to a neutral position and back into a park position without having to push a brake (not shown) of the vehicle 104. This avoids pushing the brake on a no brake fill hybrid vehicle, which can cause damage to the brake system. As a further illustrative example, in some scenarios a transmission can be shipped in a neutral position for prop shaft installation. After prop shaft installation, the shift device 102 can be used to shift the vehicle 104 to a park position. This can avoid damage to the vehicle 104 and/or the transmission 122 on a conveyor line. Other use cases can also be contemplated where the shift device 102 can provide quality and production management.

The embodiments discussed herein can also be described and implemented in the context of "computer-readable medium" or "computer storage medium." As used herein, "computer-readable medium" or "computer storage medium refers to a non-transitory medium that stores instructions, algorithms, and/or data configured to perform one or more of the disclosed functions when executed. Computer-readable medium can be non-volatile, volatile, removable, and non-removable, media implemented in any method or technology for storage of information such as computer readable instructions, data structures, modules or other data. Computer-readable medium can include, but is not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can interface with. Computer-readable medium excludes non-transitory tangible media and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A shift device for coupling with a vehicle including a transmission and an electric parking actuator, comprising:
a housing;
a battery in the housing;
a communication interface in the housing for facilitating input and output to the shift device;
a shift device connector on an end of the housing for electrically coupling the shift device to the vehicle; and
a processor disposed in the housing and operatively connected to the battery, the communication interface, and the shift device connector, wherein upon insertion of a first connector of the vehicle into the shift device connector the processor establishes an electrical and communication connection between the shift device and the electric parking actuator and thereby the processor receives a shift position of the transmission and controls the electric parking actuator to change the shift position of the transmission,
wherein the communication interface is configured to receive a user input, and upon receiving the user input, the processor controls the electric parking actuator by supplying an electric current via the battery and the shift device connector thereby providing power to the electric parking actuator.

2. The shift device of claim 1, wherein upon receiving the shift position of the vehicle, the processor controls the communication interface to output the shift position to a display on the housing.

3. The shift device of claim 1, wherein the communication interface includes a display disposed on the housing that displays the shift position of the transmission.

4. The shift device of claim 1, wherein upon receiving the user input, the processor transmits a control signal via the shift device connector to the electric parking actuator to change the shift position of the transmission to a park position or a neutral position.

5. The shift device of claim 1, wherein when the shift position of the transmission received by the processor is a park position, the processor controls the electric parking actuator to change the shift position of the transmission to a neutral position, and when the shift position of the transmission received by the processor is the neutral position, the processor controls the electric parking actuator to change the shift position of the transmission to the park position.

6. A shift device for coupling with a vehicle including a transmission and an electric parking actuator, comprising:
a housing;
a battery in the housing;
a communication interface in or on the housing for facilitating input and output to the shift device;
a shift device connector disposed on the housing for electrically coupling the shift device to the vehicle; and
a processor disposed in the housing and operatively connected to the battery, the communication interface, and the shift device connector, wherein upon connection of a first connector of the vehicle with the shift device connector the processor establishes an electrical and communication connection between the shift device and the electric parking actuator and thereby the processor controls the electric parking actuator to change the shift position of the transmission,
wherein the electrical and communication connection between the shift device and the electric parking actuator provides power to the electric parking actuator via the battery.

7. The shift device of claim 1 wherein the housing is a portable device that is removable from the vehicle when the shift device connector is disconnected from the first connector of the vehicle.

8. The shift device of claim 7 wherein the housing is a handheld device operable by a user.

9. The shift device of claim 1 wherein the end of the housing at which the shift device connector is disposed is a first end, and wherein the battery is disposed at a second end of the shift device.

10. The shift device of claim 9 further including an on/off switch disposed on the housing for controlling the supply of power via the battery.

11. The shift device of claim 10 wherein the on/off switch is a button disposed on the housing that is actuated via depression of the button.

12. The shift device of claim 11 wherein the button is depressed to initiate control of the electric parking actuator to change the shift position of the transmission.

13. The shift device of claim 1 wherein the communication interface includes a button disposed on the housing for controlling the supply of power via the battery and includes a display disposed on the housing to display the shift position of the transmission.

14. The shift device of claim 1 wherein the battery in the housing powers the electric parking actuator upon receiving said user input in lieu of the electric parking actuator receiving power from a power source of the vehicle.

15. A shift device for coupling with a vehicle including a transmission, comprising:
a housing;
a battery in the housing;
a communication interface in or on the housing for facilitating input and output to the shift device;
a shift device connector disposed on the housing for electrically coupling the shift device to the vehicle; and
a processor disposed in the housing and operatively connected to the battery, the communication interface, and the shift device connector, wherein upon connection of a first connector of the vehicle with the shift device connector the processor establishes an electrical and communication connection between the shift device and the transmission and thereby the processor receives a shift position of the transmission and controls the transmission to change the shift position of the transmission, wherein the communication interface is configured to receive a user input, and upon receiving the user input, the processor controls the transmission by supplying an electric current via the battery and the shift device connector thereby providing power to the transmission.

16. The shift device of claim 15, wherein upon receiving the shift position of the vehicle, the processor controls the communication interface to output the shift position to a display on the housing.

17. The shift device of claim 15, wherein the communication interface includes a display disposed on the housing that displays the shift position of the transmission.

18. The shift device of claim 15, wherein upon receiving the user input, the processor transmits a control signal via the shift device connector to the electric parking actuator to change the shift position of the transmission to a park position or a neutral position.

* * * * *